Patented Oct. 19, 1926.

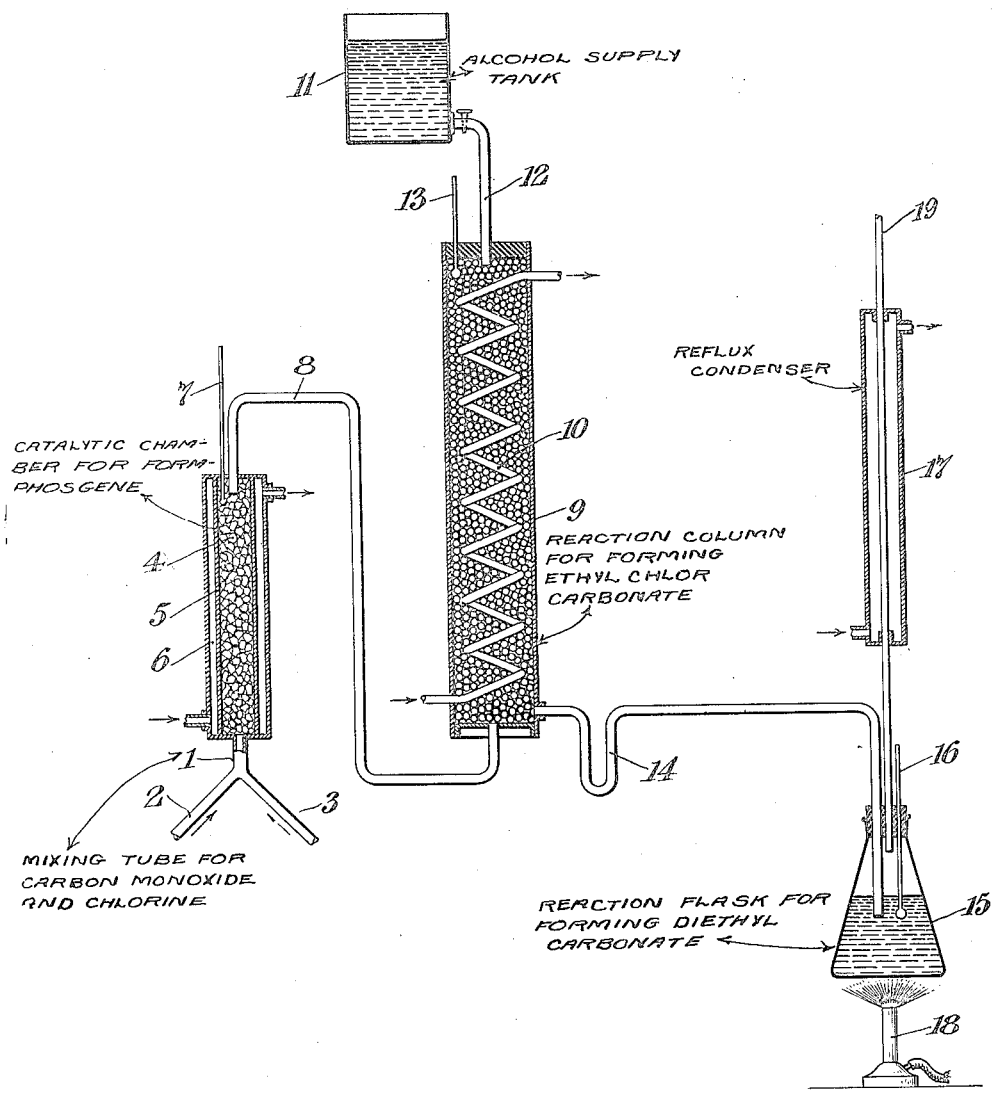

1,603,689

UNITED STATES PATENT OFFICE.

JOHN A. S. HAMMOND, OF WOODLAWN, MARYLAND, ASSIGNOR TO U. S. INDUSTRIAL ALCOHOL CO., A CORPORATION OF WEST VIRGINIA.

PROCESS FOR THE MANUFACTURE OF ALKYL CARBONATES.

Original application filed July 14, 1924, Serial No. 726,057. Divided and this application filed March 23, 1925. Serial No. 17,470.

My invention relates particularly to a process for the manufacture of alkyl carbonates but especially diethyl carbonate, and which is of such a character as to make the manufacture thereof commercially practicable so that the said products will be available for and capable of use in the various arts. It is to be understood, however, that my process is applicable particularly to the production of alkyl carbonates which are in the same aliphatic series with diethyl carbonate.

The object of my invention is to provide a process for the production of alkyl carbonates, and particularly diethyl carbonate, by means of which the desired product may be produced commercially in an advantageous and economical manner.

Inasmuch as this application is a division of my application upon alkyl carbonate manufacture, Ser. No. 726,057, filed July 14, 1924, the object of my invention is to produce alkyl carbonates in an advantageous manner in accordance with the process as set forth in said application.

Again, a further object is to separate the diethyl carbonate from the reaction mixture with the aid of inert solvents such as aliphatic hydrocarbons or chlorinated aliphatic hydrocarbons, as, for example, carbon tetrachloride, chloroform, etc., thus obtaing a complete separation of the diethyl carbonate from even large amounts of alcohol. The particular advantage of this procedure is that the carbon tetrachloride does not form a constant boiling mixture with the diethyl carbonate and, therefore, may be readily removed from the same by distillation. This has the further advantage, also, that carbon tetrachloride will abstract even small amounts of diethyl carbonate from the water layer.

The three main reactions which take place in carrying out my process are the following:

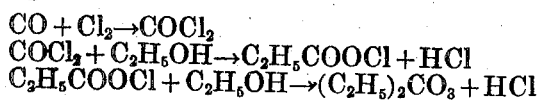

While my invention is capable of being carried out in many different ways I have described only certain ways of carrying out the same hereinafter and while it is capable of being conducted in many different types of apparatus I have shown only one type of apparatus to be used, in the drawings in which—

The figure is a diagrammatic representation of an apparatus which may be used in accordance with my invention.

Phosgene may be formed in any suitable way, as, for example, by bringing carbon monoxide and chlorine together in a tube 1 by means of branch supply tubes 2 and 3 provided for carbon monoxide and chlorine respectively, the two gases being brought together in the proportions of mol for mol. Thence the gases pass over a suitable catalyst, as, for example, activated charcoal 4 in a chamber 5 surrounded by a cooling jacket 6 and supplied with a current of cooling water, the temperature being kept down to a point preferably below 250° C., a thermometer 7 being provided for this purpose as the reaction is exothermic. Thereafter the phosgene and admixed gases pass out through a tube 8 to the lower end of a column 9 filled with glass beads, which is cooled by a coil 10 supplied with a current of water. In the column 9 the phosgene is brought into contact with a current of absolute alcohol supplied from a tank 11 by means of a tube 12 to the top of the column. Preferably the absolute alcohol is supplied in the ratio of 240 grams of the same to 224 grams of phosgene so as to provide an excess of 15% of the ethyl alcohol above the theoretically required amount for the production of diethyl carbonate although it is to be understood that a larger or smaller excess of alcohol may be present if desired. The temperature of the column 9 is kept below 40° C., a thermometer 13 being provided for this purpose. The reaction mixture is then run by a trapped pipe 14 into a flask 15 provided with a thermometer 16 and having a reflux condenser 17 connected thereto and heat is supplied from a burner 18 to the flask 15 so as to change the ethyl chlorocarbonate which has been formed in the tower 9 to diethyl carbonate. Refluxing is desirable for this purpose when the alcoholic concentration does not exceed 50% above the theoretical amount of alcohol required in the reaction of forming diethyl carbonate. Preferably the reaction mixture is, therefore, refluxed from the flask 15 for a period of approximately 16 hours at approximately between 50 to 55° C. The time may be cut down by increasing the temperature up to the boiling point of diethyl carbonate, namely 126° C. The hydrochloric acid escapes from the top of the reflux condenser 17 through a tube 19. Inasmuch, however, as ethyl chlorocarbonate is entrained with the hydrochloric acid at the beginning when the free hydrochloric acid concentration is at the highest point, that is to say amounting to 35%, the refluxing is preferably started at 45° C. and kept at this temperature for approximately 2 hours after which the temperature is raised to from 50 to 55° C. and run carefully for 16 hours. The time may be cut down by increasing the temperature up to the boiling point of diethyl carbonate, namely 126° C. The refluxing conducted for this period of time results in reducing the free hydrochloric acid to 5.3% while the combined hydrochloric acid in the form of ethyl chlorocarbonate is only 1.8%. Continued refluxing for 7 hours longer converts all of the ethyl chlorocarbonate to diethyl carbonate and the free hydrochloric acid is reduced to 2.5% at the end of that period. The final reaction mixture contained in the flask 15 may then be removed and treated for the separation of the diethyl carbonate from the other substances present, such as alcohol and hydrochloric acid. For example, the reaction mixture may contain from 50 to 90% of the ester, 2 to 12% of the hydrochloric acid and the remainder alcohol. The separation of the diethyl carbonate from the other constituents contained in the reaction mixture will be more effective in the case where only a slight excess of alcohol has been used over the theoretical amount required to combine with the phosgene. This is especially important inasmuch as diethyl carbonate and ethyl alcohol are difficult to separate merely by distillation. The advantage of using only a slight excess of alcohol is apparent from the following comparison: When 110 c. c. of the reaction mixture containing 10% ethyl alcohol and 90% diethyl carbonate is washed with 110 c. c. of water, an oil layer of 100 c. c. will separate, comprising 97.2% of the ester present in the two layers, while if the alcoholic concentration is 50% in excess the ester layer which will separate will contain only 55 c. c. and the percentage of the ester in the oil layer will be only 79.6% of the ester in the two layers. For this purpose, therefore, the weighed portion of the reaction mixture may be titrated with $\frac{1}{10}$ normal sodium hydroxide solution in water and the amount of caustic solution to be added to the mixture is calculated therefrom as being sufficient for neutralizing the free hydrochloric acid, the caustic soda solution to be added being diluted with water to a 20% strength solution before being added. The caustic soda solution is then added very slowly to the reaction mixture while cooling and agitating the same. By this means it will be found that the liquid will separate into two layers and that even small amounts of free hydrochloric acid that might have been present with the ester layer will have been removed. The addition of the 20% caustic solution in this way neutralizes some of the acid immediately but most of the neutralization takes place during the agitation which requires from 4 to 8 hours. It is found, also, that a 20% caustic soda solution will not mix with the reaction mixture. The salt water layer will be found to contain the sodium chloride formed from the neutralization and less than ½ of 1% of ester. If desired, the upper water layer may be subsequently rectified by distilling the same after removal from the water layer.

For the purification, however, if desired, instead, the contents of the flask 15 may be subjected to a somewhat different treatment for the separation of the diethyl carbonate therefrom by subjecting the same to extraction with inert solvents in the form of aliphatic hydrocarbons or chlorinated derivatives thereof, as, for example, carbon tetrachloride, chloroform or petroleum ether and, in fact, any diethyl carbonate solution containing alcohol may be separated in this way. For example, in the case where the solution contains 50 c. c. of absolute alcohol and 50 c. c. of diethyl carbonate, 50 c. c. of carbon tetrachloride is added and the mixture shaken, and there may then be added 100 c. c. of water and the mixture again shaken. As a result two liquid layers are formed, the lower layer containing diethyl carbonate and carbon tetrachloride showing an increase of 50 c. c. corresponding to the amount of diethyl carbonate added originally. This lower layer may then be removed and distilled to separate the diethyl carbonate from the carbon tetrachloride by fractionation. The carbon tetrachloride distills over between 66° and 79° C., 50 c. c. being recovered. Also 2 c. c. of diethyl carbonate distills between 50° and 122° C. and 47 c. c. distills between 123° and 127° C., the last mentioned fraction being comprised of 94% diethyl carbonate. In this way the diethyl carbonate will be completely separated from the ethyl alcohol inasmuch as the carbon tetrachloride does not form constant boiling mixtures with the diethyl carbonate and the complete extraction of even small amounts of diethyl carbonate in water containing alcohol, is possible in this way. The use of chloroform and petroleum ether gives equally good results.

While I have described my invention above in detail I wish it to be understood that many changes may be made therein without departing from the spirit of the same.

I claim:

1. The process which comprises forming a dialkyl carbonate in a reaction mixture containing phosgene and an aliphatic alcohol involving heating and refluxing and recovering the carbonate from the reaction mixture by the addition of an inert solvent thereafter in the form of a liquid aliphatic compound which in the presence of water acts as a non-solvent for the alcohol layer formed and adding water to the solution to form separate liquid layers.

2. The process which comprises forming a dialkyl carbonate in a rection mixture containing phosgene and an aliphatic alcohol and recovering the carbonate from the reaction mixture by the addition of an inert solvent in the form of carbon tetrachloride and adding water to the solution to form separate liquid layers.

3. The process which comprises reacting upon an aliphatic alcohol with phosgene, thus forming an alkyl chlorocarbonate carrying the reaction farther to produce a dialkyl carbonate involving heat and refluxing and recovering the carbonate from the reaction mixture by the addition of an inert solvent thereafter in the form of a liquid aliphatic compound which in the presence of water acts as a non-solvent for the alcohol layer formed and adding water to the solution to form separate liquid layers.

4. The process which comprises reacting upon an aliphatic alcohol with phosgene, thus forming an alkyl chlorocarbonate carrying the reaction farther to produce a dialkyl carbonate involving heating and refluxing and recovering the carbonate from the reaction mixture by the addition of an inert solvent in the form of carbon tetrachloride and adding water to the solution to form separate liquid layers.

5. The process which comprises reacting upon an aliphatic alcohol with phosgene, thus forming an alkyl chlorocarbonate carrying the reaction farther to produce a dialkyl carbonate and recovering the carbonate from the reaction mixture by the addition of an inert solvent thereafter in the form of a liquid aliphatic compound which in the presence of water acts as a non-solvent for the alcohol layer formed, adding water to the solution to form separate liquid layers and distilling the ester containing layer to separate the ester from the solution by fractionation.

6. The process which comprises reacting upon an aliphatic alcohol with phosgene, thus forming an alkyl chlorocarbonate carrying the reaction farther to produce a dialkyl carbonate and recovering the carbonate from the reaction mixture by the addition of an inert solvent in the form of carbon tetrachloride, adding water to the solution to form separate liquid layers and distilling the ester containing layer to separate the ester from the solution by fractionation.

7. The process which comprises reacting upon alcohol with phosgene, thus forming ethyl chlorocarbonate carrying the reaction farther to produce diethyl carbonate involving heating and refluxing and recovering the carbonate from the reaction mixture by the addition of an inert solvent thereafter in the form of a liquid aliphatic compound which in the presence of water acts as a non-solvent for the alcohol layer formed and adding water to the solution to form separate liquid layers.

8. The process which comprises reacting upon alcohol with phosgene, thus forming ethyl chlorocharbonate carrying the reaction farther to produce diethyl carbonate and recovering the carbonate from the reaction mixture by the addition of an inert solvent in the form of carbon tetrachloride and adding water to the solution to form separate liquid layers.

9. The process which comprises reacting upon alcohol with phosgene, thus forming ethyl chlorocarbonate carrying the reaction farther to produce diethyl carbonate involving heating and refluxing and recovering the carbonate from the reaction mixture by the addition of an inert solvent thereafter in the form of a liquid aliphatic compound, which in the presence of water acts as a non-solvent for the alcohol layer formed, adding water to the solution to form separate liquid layers and distilling the ester containing layer to separate the ester from the solution by fractionation.

10. The process which comprises reacting upon alcohol with phosgene, thus forming ethyl chlorocarbonate carrying the reaction farther to produce diethyl carbonate and recovering the carbonate from the reaction mixture by the addition of an inert solvent in the form of carbon tetrachloride, adding water to the solution to form separate liquid layers and distilling the ester containing layer to separate the ester from the solution by fractionation.

In testimony that I claim the foregoing, I have hereunto set my hand this 17th day of March, 1925.

JOHN A. S. HAMMOND.